United States Patent

Szeles

[15] 3,643,081
[45] Feb. 15, 1972

[54] ANTIGLARE HEADLIGHTS

[72] Inventor: Marcel Szeles, 3605 Sandwich Street, West, Windsor, Ontario, Canada

[22] Filed: Nov. 21, 1969

[21] Appl. No.: 878,668

[30] Foreign Application Priority Data

Sept. 15, 1969 Canada....................................61,954

[52] U.S. Cl.......................................240/7.1 R, 240/41.4 R
[51] Int. Cl..................................................B60q 1/04
[58] Field of Search...............240/7.1 R, 7.1 G, 7.1 E, 7.1 C, 240/41.4 R, 106.1, 8.1, 8.2, 8.1 R

[56] References Cited

UNITED STATES PATENTS

| | | | |
|---|---|---|---|
| 1,587,375 | 6/1926 | Gignac | 240/8.2 |
| 2,254,962 | 9/1941 | Harris et al. | 240/106.1 |
| 2,255,366 | 9/1941 | Ruiz | 240/8.2 |
| 2,784,303 | 3/1957 | Heiser | 240/7.1 |
| 2,849,598 | 8/1958 | Lipscomb | 240/7.1 C X |

*Primary Examiner*—Louis R. Prince
*Assistant Examiner*—Daniel M. Yasich
*Attorney*—Charles Krassov

[57] ABSTRACT

This invention consists of a car headlights in which a far-beam headlight is in combination with a standard parallel beam headlight to the underside of which the far-beam headlight is pivotally attached so that it can be adjusted and held at an angle to the parallel beam headlight. A dome-shaped rear on the far-beam headlight is provided with a light source which passes through a lens in the front of the said headlight. This lens has a principal focus a short distance in front of it so that the light which passes through it diverges. The above-mentioned angle of the far-beam headlight is such that the upper limit line of the diverging beam of light emerging from the far-beam headlight is parallel to the highway upon which the said car travels, and below the sight of the driver of an oncoming car.

1 Claim, 3 Drawing Figures

PATENTED FEB 15 1972 3,643,081

Inventor
MARCEL SZELES
per
Chas. Krassov
Attorney

ANTIGLARE HEADLIGHTS

This invention relates generally to headlights used on automobiles, and particularly to antiglare far-beam headlights.

At the present time cars are equipped with a combination of regular headlights which are usually of the diffused beam type and which are used for normal night driving, and far-beam headlights which are used at night to light up a far distance of the road ahead of the car to provide better vision on roads which are not lighted by overhead lamps. Although the far-beam headlights are essential to night highway driving they have one bad feature in that they tend to momentarily blind the driver of an oncoming car thus creating a serious safety hazard. As a result, night drivers are constantly turning off their far-beam lights when a car is approaching from the opposite direction, and turning them on again when the car passed. This procedure also creates a safety hazard because both drivers are driving under conditions of poor visibility.

It is therefore the object of this invention to provide a headlight for a car which has the normal night driving light and the far-beam light for highway driving which does not interfere with the vision of the driver of an oncoming car.

This is accomplished in the invention by providing a far-beam light which efficiently lights up the road but whose beam is completely and considerably below the eye level of the driver.

In describing the invention reference will be made to the attached drawings in which.

Figure 1:
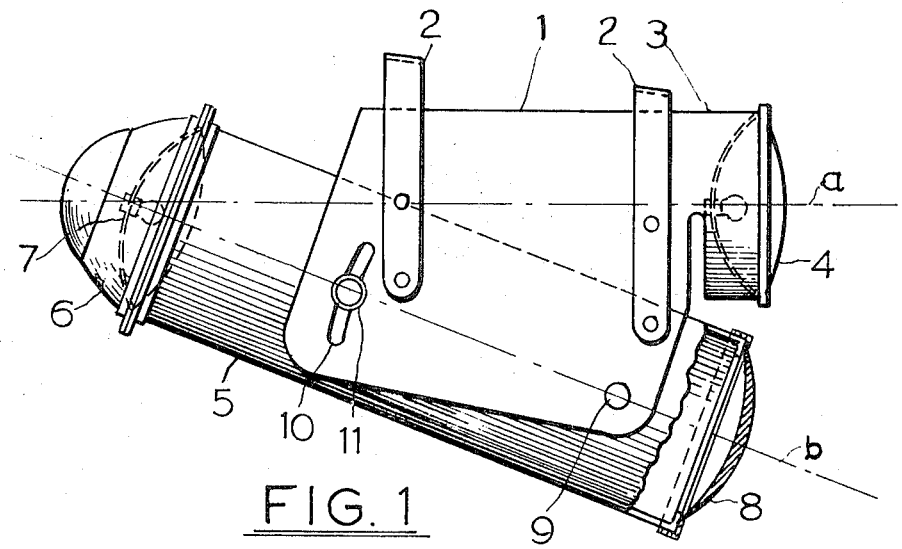
FIG. 1 is an elevation of the invention.

In the drawings, the invention is shown consisting of an inverted U-shaped main body 1 which is equipped with brackets 2,2, by means of which the said body can be affixed to a car. These brackets are shown by way of example only as one means of attachment.

Figure 2:
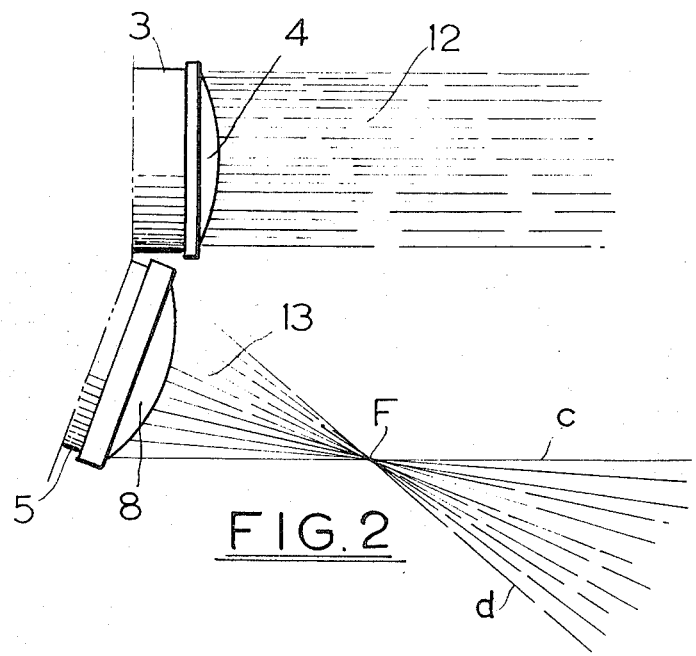
FIG. 2 is an elevation showing the light beam arrangement.

The main body 1 terminates in front into a tubular casing 3 which contains a standard headlight 4 which may be either of the diffused beam or parallel beam type. The lower part of the body 1 contains a tubular casing 5 which houses the far-beam components. The rear of the casing 5 is covered by a dome-shaped enclosure 6 which contains a standard headlight 7 of the parallel beam type or any other reflector and light arrangement which will throw a parallel beam of light towards the front end of the casing 5. The front of the casing 5 is covered with a special lens 8 which is ground to have an outside principal focus F located on its centerline $b$ a short distance ahead of itself, as shown in FIG. 2. The parallel beam of light which passes through the lens 8 converges to the point F as shown by the light rays 13, then the rays diverge having an upper limit line $c$ and a lower limit line $d$.

The casing 5 is pivotally attached to the main body 1 at 9 so that the said casing can be rotated to assume the required angle which is essential to the proper functioning of the invention, as will be described further on in the specification. After adjustment, the casing 5 can be locked in position by the bolt 11 which is attached to the said casing and slides within the curved slot 10 in the body 1.

Figure 3:
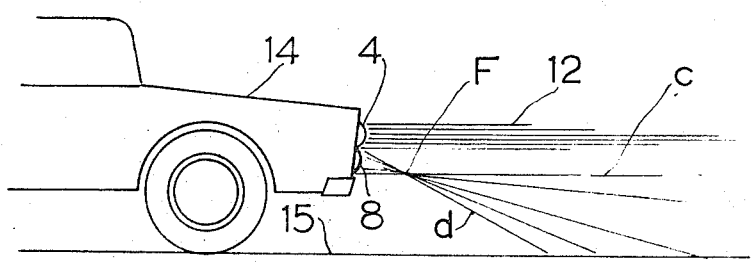
FIG. 3 is a diagram showing the headlight beams in relation to the road.

In FIG 3, the invention is shown in operation mounted on a car 14 which is traveling on a road 15. The upper standard light 4 emits a parallel beam of light 12 whose centerline $a$ is parallel with the road. This beam may also be of the diffused type. The lower far-beam light which passes through the lens 8 is bent at an angle so that the upper limit line $c$ is parallel to the road 15 and is considerably below the eye level of the driver. The lower limit line $d$ is cut short by road 15 which is thus intensely illuminated.

As a further improvement on existing headlights, the beam 12 thrown by the standard headlight 4 can be tinted with a pale color, preferably blue. This type of light is considered easier on the eyes and it has a further advantage in that it can be distinguished from the far-beam light which is white, thus enabling the driver of an oncoming car to tell whether the far-beam light is on or off.

The headlights as described in the above specification are installed on a car in the usual locations.

Having described the invention what I claim is:

1. An antiglare headlight on a car comprising a standard headlight in combination with a far-beam headlight which consists of a tubular casing having a dome-shaped enclosure at the rear thereof and a lens mounted in the front thereof, a parallel beam light source located in the dome-shaped enclosure, said lens having a short principal focus located in the front thereof so that when said parallel beam of light passes through said lens the light is refracted to diverge from the principal focus into a long diverging beam having a sharply defined upper limit line and a similar lower limit line; an inverted U-shaped main body for combining and holding said two headlights; bracket means for attaching the main body to the proper location on a car; the said far-beam tubular casing beam pivotally attached to the main body at the front end thereof and means for locking the far-beam casing at an angle to the centerline of the standard headlight to make the upper limit line of the diverging beam parallel to the road upon which the car travels, said locking means comprising a tightening bolt attached to the far-beam casing and a slot in said main body, through which the bolt slides.

* * * * *